United States Patent [19]
Tout

[11] 3,768,715
[45] Oct. 30, 1973

[54] PLANETARY DIFFERENTIAL AND SPEED SERVO

[75] Inventor: Stanley D. Tout, Arcadia, Calif.

[73] Assignee: Bell & Howell Company, Chicago, Ill.

[22] Filed: May 1, 1972

[21] Appl. No.: 249,046

[52] U.S. Cl............................ 226/40, 74/796, 226/31, 226/44
[51] Int. Cl............................................... B65h 23/18
[58] Field of Search....................... 226/31, 44, 40; 74/797, 801, 798, 697, 796

[56] References Cited
UNITED STATES PATENTS

| | | | |
|---|---|---|---|
| 1,399,443 | 12/1921 | Rennerfelt | 74/798 |
| 2,974,574 | 3/1961 | Egan | 74/796 |
| 2,996,583 | 8/1961 | Springer | 226/40 X |
| 3,001,420 | 9/1961 | Juenke | 74/798 |
| 3,585,878 | 6/1971 | Heckenbach | 74/675 |
| 3,645,430 | 2/1972 | Lagain | 226/40 |

Primary Examiner—Richard A. Schacher
Attorney—Luc P. Benoit

[57] ABSTRACT

A planetary differential employs a longitudinal shaft having a restricted portion at least two balls directly engaging the longitudinal shaft at said restricted portion forming an inner race. The differential includes further an outer race having a taper engaged by the balls and a cage for the balls. A first rotary input is provided to one of the inner race, outer race, and cage. A secondary rotary input is provided to another of the inner race, outer race, and cage. A rotary output is provided to yet another of the inner race, outer race, and cage. The inner race and outer race are mounted for rotary movement.

A servo system, including the planetary differential, is also disclosed.

20 Claims, 3 Drawing Figures

PATENTED OCT 30 1973 3,768,715

PLANETARY DIFFERENTIAL AND SPEED SERVO

BACKGROUND OF THE INVENTION

1. Field of the Invention

The subject invention relates to planetary differentials and to apparatus for controllably moving an object.

2. Description of the Prior Art

In typical planetary differentials toothed gears are employed to provide the necessary differentiation between inputs and outputs. These gears have numerous disadvantages. They are sensitive to wear and must be inspected often. They have relatively high frictional losses and, therefore, to obtain a given output, relatively higher inputs must be provided. More importantly, they must be manufactured to close tolerances, and therefore, are expensive.

In addition, in systems requiring quiet operation, the noise of a planetary differential employing conventional sun and planet gears with teeth often cannot be tolerated.

In the past, ball bearings were used in speed reducing mechanisms to overcome space limitations. Such a mechanism is shown in "Ingenious Mechanisms for Designers and Inventors," Vol. IV, Ch. 12, pp. 279–81, by John A. Newell and Holbrook L. Horton (Industrial Press, 1967). It includes a ball bearing which has one race driven and the other race connected to a motor frame. The power output is taken from the ball cage. A dual-input differential action is lacking.

SUMMARY OF THE INVENTION

It is an object of the subject invention to overcome the the above mentioned disadvantages.

Another object is to provide an improved planetary differential.

A further object is to provide a system that includes a planetary differential for controllably moving an object.

Another object is to maintain a desired object movement by sensing excessive and insufficient movement of the object and providing corrective action through a planetary differential.

Other objects of the subject invention will become apparent in the further course of this disclosure.

From one aspect thereof, this invention resides in a planetary differential comprising in combination a longitudinal shaft having a restricted portion at least two balls directly engaging said longitudinal shaft of said restricted portion forming an inner race for the balls, an outer race for the balls, having a taper engaged by said balls, a cage for the balls, first rotary input means connected to one of the inner race, outer race and cage, second rotary input means connected to another of the inner race, outer race and cage, rotary output means connected to yet another of the inner race, outer race and cage, and means for mounting the races for rotary movement.

From another aspect thereof, the subject invention resides in an apparatus for controllably moving an object comprising in combination a longitudinal shaft having a restricted portion, at least two balls directly engaging said longitudinal shaft of said restricted portion forming, an inner race for the balls, an outer race for the balls having a taper engaged by said balls, a cage for the balls, means for mounting the races for rotary movement, first driving means connected to one of the inner race, outer race and cage, second driving means connected to another of the inner race, outer race and cage, means for coupling the object for movement to yet another of the inner race, outer race and cage, and means connected to the first driving means for selectively energizing the first driving means.

BRIEF DESCRIPTION OF THE DRAWINGS

The invention and its objects will become more readily apparent from the following detailed description of preferred embodiments thereof, illustrated by way of example in the accompanying drawings, in which.

Like reference numerals in the drawings designate like or functionally equivalent parts.

DESCRIPTION OF PREFERRED EMBODIMENTS

Figure 2:
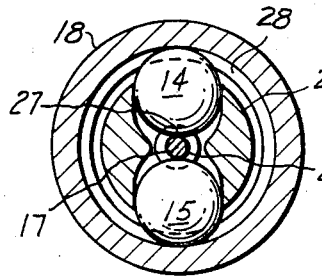
FIG. 2 is a view taken on the line 2—2 of FIG. 1.
Figure 1:
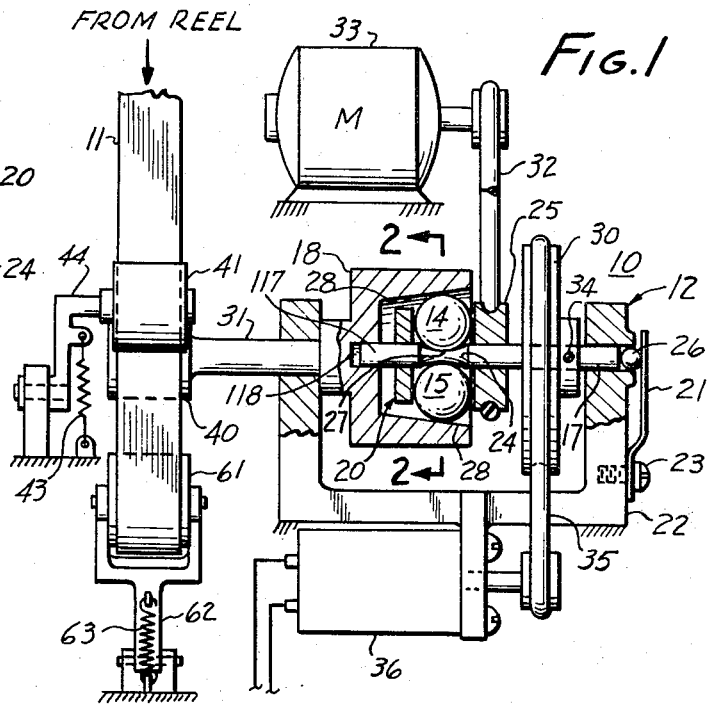
FIG. 1 is a side view, partially in section, of an apparatus that includes a planetary differential for controllably moving an object in accordance with a preferred embodiment of the invention.

A planetary differential speed servo 10 is shown in FIGS. 1 and 2 as employed in an apparatus that controllably moves a web of material 11. The servo 10 includes a planetary differential 12 comprising two balls 14 and 15, an inner race 17 for the balls, an outer race 18 for the balls, a cage 20 for the balls, and a case 22 for mounting the races for rotary movement.

According to the invention, the inner race 17 takes the form of a shaft (hereinafter referred to as shaft 17). The shaft 17 has a tapered or restricted portion or groove 24, the bottom 27 of which is curved at a radius slightly larger than the radius of each of the balls 14 and 15. This assures a smooth rolling action of the balls around the shaft 17. As seen in FIG. 1, the shaft has a free end 117 extending into a cavity 118 in the outer race 18 which thus provides a bearing for the free shaft end. The cage 20 is integral with a pulley 25 and contains the balls 14 and 15, maintaining them spaced from each other.

These components are shown in section in FIG. 2. The balls 14 and 15 contact the tapered portion 24 of shaft 17. In addition, the balls contact a tapered portion 28 of the outer race 18.

In FIG. 1, a leaf spring 21 is attached to case 22 by a screw 23. The spring 21 acts on a ball 26 for thrust loading the shaft 17 toward the bearing formed by the cavity 118 in the outer race 18. This has a desirable effect of loading the balls against the tapered portion 28 of the outer race 18. The taper provides mechanical advantage with respect to the loading applied by spring 21. Therefore, by adjusting the degree of the taper or the force of spring 21, the frictional contact necessary to drive the outer race 18 is obtained.

A first rotary input is provided through the pulley 25 which is integral with the cage 20.

In operation, the first rotary input is provided by a belt 32 from a motor 33. The belt drives pulley 25 which is integral with cage 20. Cage 20 drives balls 14 and 15 which rotate the outer race 18 by frictional contact. The necessary drive friction is achieved by spring 21 which thrusts loads the shaft 17 against the balls 14 and 15.

A second rotary input is provided by a belt 35 from a motor 36 which drives a pulley 30. Pulley 30 is fastened to shaft 17 by a screw 34. Rotation of the shaft 17 causes the outer race 18 to rotate through frictional contact with the balls 14 and 15.

Therefore, inputs at pulleys 25 and 30 determine the rotational speed of the outer race 18.

Output is taken from the outer race 18 through the shaft 31 which is connected to the outer race. A roller 40 over which the web of material 11 passes is connected to the shaft 31. A roller 41 pinches the web 11 against roller 40 by means of a bias spring 43 connected to the roller arm 44. Thus, the roller 40 serves to drive the web 11.

Those skilled in the art will readily recognize that the subject invention is not limited in any of the following respects: Inputs or outputs may be provided to or taken from either the inner race, outer race, or the cage. Also, the number of balls employed is limited only by the physical dimensions of the inner race. And, the inner race need not take the form of a shaft.

Figure 3:
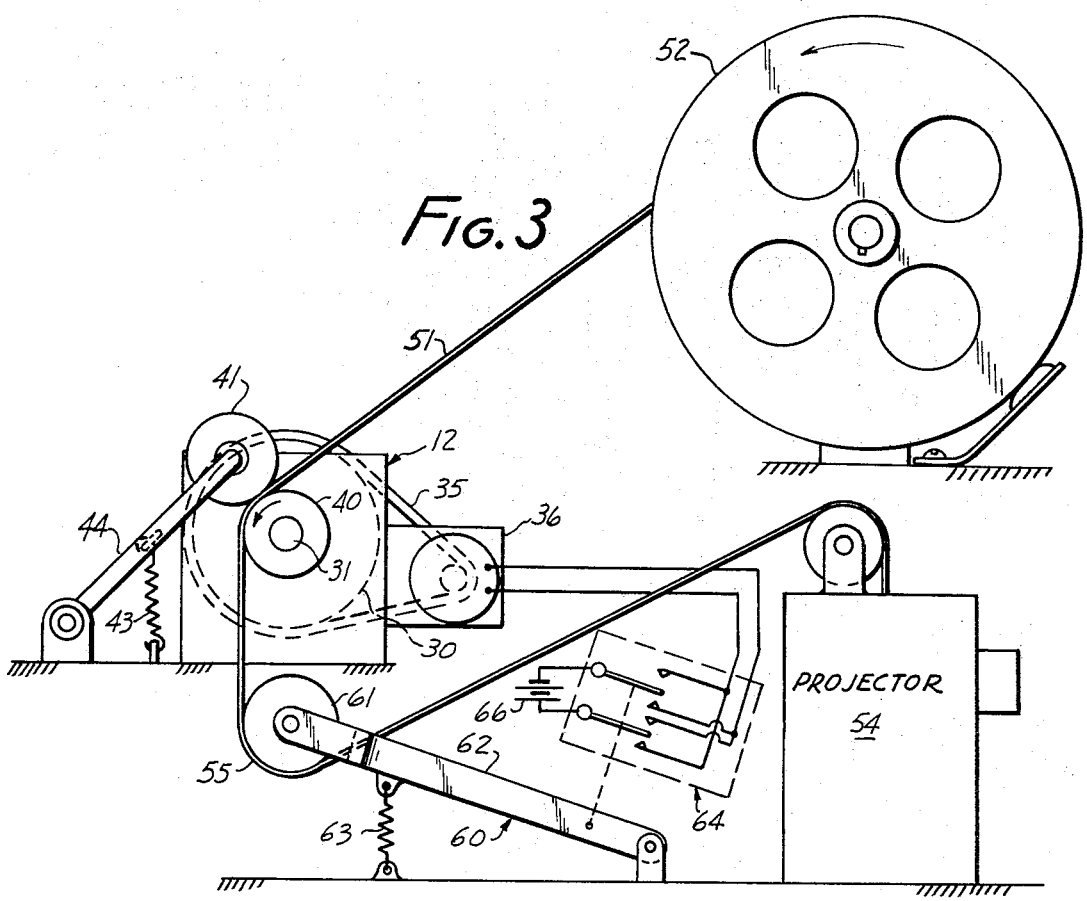
FIG. 3 is a view of the planetary differential and speed servo in a suggested use in a motion picture projection system.

FIG. 3 illustrates a typical projection system in which the planetary differential and speed servo may be utilized. The belt 32 (see FIG. 1) drives pulley 25 which is integral with cage 20. Cage 20 drives the balls 14 and 15 which rotate the outer race 18, the integral shaft 31, and the roller 40.

Film 51 from a supply reel 52 is pinched between the spring-biased roller 41 and the drive roller 40. The film is then looped around a roller 61 and into a projector 54. Ratios are designed such that nominal film velocity will equal projection (claw or sprocket) speed.

A loop 55 in film 51 must be maintained to provide free claw or sprocket action, thus isolating the projector proper from supply reel loads. This is accomplished by a film tension sensor 60 which comprises a combination the roller 61 around which the loop 55 is formed, an arm 62, a spring 63, and a switch 64 of a polarity reversal type.

If the film supply velocity is too slow, loop 55 will decrease in size and arm 62 will pull against spring 63, closing the upper set of contacts of switch 64. This causes the magnetic motor 36 to be energized from an electric power source 66 in a rotational direction required to correct the film velocity and restore loop 55. The servo motor 36 drives belt 35 which rotates pulley 30. Pulley 30 is fastened to shaft 17 which is in contact with the balls 14 and 15. In turn, the balls 14 and 15 drive the outer race 18, integral shaft 31 and roller 40. Therefore, by energizing the motor 36, a corrective rotary input is added through the planetary differential to the rotary input supplied by the projector motor 33. Thus, the outer race 18, and therefore the film drive roller 40, is speeded up, allowing the film tension sensor 60 to return to its nominal position. In this position, the switch 64 is open, and the motor 36 is de-energized.

Conversely, if film supply velocity is too fast, the film tension sensor 60 acts in the opposite direction and the reverse polarity is applied to the motor 36 through the lower contacts of switch 64. In this case, the reverse input of the motor 36 through the planetary differential 12 would subtract from the input of the projector drive motor 33. Therefore, the result would be a slowing of the speed of film drive roller 40 until the film tension sensor has again returned to its nominal position.

It should be recognized that although the switch 64 is illustrated as an electro-mechanical switch, this switch can be one of the proximity types (photo electric or magnetic) that requires no mechanical force transmission to actuate.

It should also be noted that the motor 36 is small since it only furnishes power to cancel the speed error in the system. By way of example, a magnetic motor, in which a change in polarity will produce a change in rotational direction, may be used. No limitation to magnetic or d.c. motors is intended, since other reversible drives may be used instead.

In addition, it can be seen that the system is reversible. Reversing projector drive motor 33 which reverses belt 32 and the direction of film 51 causes the system to operate in reverse. If the rewind velocity is too slow, loop 55 will increase in size causing the lower set of contacts of switch 64 to close. This now energizes motor 36 in such a manner that its rotational input through the planetary differential 12 will add to the input of the projector drive motor 33. Therefore, film drive roller 40 will increase in speed causing the slack in loop 55 to be taken up until the film tension sensor 60 returns to its nominal position.

If the rewind film velocity is too fast, the loop 55 will decrease in size, the upper contacts of switch 64 will close, and the reverse polarity will be applied to motor 36. This causes the film speed to decrease due to the subtractive input of motor 36 through the planetary differential, until the film tension sensor again returns to its nominal position.

It is now readily recognizable that the subject invention overcomes the disadvantages of conventional planetary gear differentials. Specifically, the balls employed are practically insensitive to wear and may be hardened and ground using similar methods as for conventional ball bearings. Also, the system has small frictional losses, since it operates with rolling friction and avoids sliding friction in normal operation. In addition, the balls and races are easily manufactured, are much less expensive than conventional gears, and the complete lack of meshing gears provides very quiet operation. Most importantly, very high speed ratios are attainable between the shaft 17 and the race 18 and cage 20, since the diameter of the shaft 17 may be small relative to the diameter of a corresponding gear wheel in a conventional differential gear. As one advantage, this saves a stepdown gear stage between the servo motor 36 and the shaft 17.

I claim:

1. A planetary differential comprising in combination:
   a longitudinal shaft having a restricted portion;
   at least two balls directly engaging said longitudinal shaft at said restricted portion forming an inner race for said balls;
   an outer race for said balls having a taper engaged by said balls;
   a cage for said balls;
   first rotary input means connected to one of said inner race, outer race and cage;
   second rotary input means connected to another of said inner race, outer race and cage;
   rotary output means connected to yet another of said inner race, outer race and cage; and
   means for mounting said races for rotary movement.

2. A planetary differential as claimed in claim 1, wherein:

said first rotary input means are connected to said inner race;

said second rotary input means are connected to said cage; and said rotary output means are connected to said outer race.

3. A planetary differential as claimed in claim 1, wherein:

said planetary differential has only two of said balls.

4. A planetary differential as claimed in claim 1, wherein:

said restricted shaft portion is curved and has a radius larger than the radius of each of said balls.

5. A planetary differential as claimed in claim 1, wherein:

said shaft has a free end and said outer race has a cavity forming a bearing for said free shaft end.

6. A planetary differential as claimed in claim 5, including in said combination:

means for biasing said shaft in an axial direction toward said bearing in the outer race.

7. A planetary differential as claimed in claim 6, wherein:

said restricted shaft portion is curved and has a radius larger than the radius of each of said balls.

8. A planetary differential as claimed in claim 7, wherein:

said planetary differential has only two of said balls.

9. A planetary differential as claimed in claim 1, including said combination:

a drive pulley integral with said cage.

10. An apparatus for controllably moving an object, comprising in combination:

a longitudinal shaft having a restricted portion;

at least two balls directly engaging said longitudinal shaft at said restricted portion forming an inner race for said balls;

an outer race for said balls having a taper engaged by said balls;

a cage for said balls;

means for mounting said races for rotary movement;

first driving means connected to one of said inner race, outer race and cage;

second driving means connected to another of said inner race, outer race and cage;

means for coupling said object for movement to yet another of said inner race, outer race and cage; and means connected to said first driving means for selectively energizing said first driving means.

11. An apparatus as claimed in claim 10, wherein:

said object is a web of material; and said means for selectively energizing said first driving means include means for sensing excessive and insufficient movement of said web, and means connected to said sensing means and to said first driving means for selectively energizing said first driving means in a first sense and in a second sense, respectively, in response to sensing of excessive and insufficient web movement.

12. An apparatus as claimed in claim 11, wherein:

said sensing means include means for sensing the size of a loop of said web.

13. An apparatus as claimed in claim 10, wherein:

said first driving means are connected to said inner race;

said second driving means are connected to said cage; and said coupling means are connected to said outer race.

14. An apparatus as claimed in claim 10, wherein:

said planetary differential has only two of said balls.

15. An apparatus as claimed in claim 10, wherein:

said restricted shaft portion is curved and has a radius larger than the radius of each of said balls.

16. An apparatus as claimed in claim 10, wherein:

said shaft has a free end and said outer race has a cavity forming a bearing for said free shaft end.

17. An apparatus as claimed in claim 16, including in said combination:

means for biasing said shaft in an axial direction toward said bearing in the outer race.

18. An apparatus as claimed in claim 17, wherein:

said restricted shaft portion is curved and has a radius larger than the radius of each of said balls.

19. An apparatus as claimed in claim 18, wherein:

said planetary differential has only two of said balls.

20. An apparatus as claimed in claim 10, including in said combination:

a drive pulley integral with said cage.

* * * * *